United States Patent
Chen et al.

(10) Patent No.: US 10,983,422 B2
(45) Date of Patent: Apr. 20, 2021

(54) PROJECTION DEVICE

(71) Applicant: Coretronic Corporation, Hsin-Chu (TW)

(72) Inventors: Wei-Hao Chen, Hsin-Chu (TW); Shu-Yu Lin, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 7 days.

(21) Appl. No.: 16/396,770

(22) Filed: Apr. 29, 2019

(65) Prior Publication Data
US 2019/0369468 A1   Dec. 5, 2019

(30) Foreign Application Priority Data
May 31, 2018   (CN) .......................... 201810551545.X

(51) Int. Cl.
*G03B 21/14*   (2006.01)
*G03B 21/00*   (2006.01)
*G02B 26/08*   (2006.01)

(52) U.S. Cl.
CPC .......... *G03B 21/142* (2013.01); *G02B 26/08* (2013.01); *G02B 26/0875* (2013.01); *G03B 21/005* (2013.01)

(58) Field of Classification Search
CPC ..... G03B 21/00–64; H04N 9/31–3197; H04N 9/00–898; G02B 26/00–129; G02B 7/00–40; G02B 27/00–648; G09G 3/007
See application file for complete search history.

(56) References Cited

U.S. PATENT DOCUMENTS

| | | | | |
|---|---|---|---|---|
| 2008/0151356 A1* | 6/2008 | Fujita | ................. | G09G 3/007 |
| | | | | 359/298 |
| 2016/0227177 A1* | 8/2016 | Mizoguchi | .......... | G03B 21/142 |
| 2016/0306269 A1* | 10/2016 | Gyoten | ............... | G03B 21/142 |

(Continued)

FOREIGN PATENT DOCUMENTS

| | | |
|---|---|---|
| CN | 101131532 | 2/2008 |
| CN | 105807385 | 7/2016 |
| CN | 105842845 | 8/2016 |

(Continued)

OTHER PUBLICATIONS

"Office Action of China Counterpart Application", dated Dec. 3, 2020, p. 1-p. 6.

*Primary Examiner* — Michelle M Iacoletti
*Assistant Examiner* — Christopher A Lamb, II
(74) *Attorney, Agent, or Firm* — JCIPRNET

(57) ABSTRACT

A projection device including a lens module and an actuating module is provided. The lens module includes at least one lens and is used for transferring an image beam. The actuating module is disposed beside the lens module, and is relatively close to the at least one lens. The actuating module includes a frame, a transparent element and at least one actuator. The transparent element is fixed on the frame. The actuator is disposed on at least one side edge of the frame, and is connected to the frame. In a light emission direction of the lens module, an orthographic projection of the actuator on a first reference plane does not overlap with an orthographic projection of the at least one lens on the first reference plane.

9 Claims, 6 Drawing Sheets

(56) References Cited

U.S. PATENT DOCUMENTS

2016/0377962 A1\* 12/2016 Mizoguchi ........... G03B 21/142
  353/22
2017/0371173 A1\* 12/2017 Bietry ................ G02B 26/0891

FOREIGN PATENT DOCUMENTS

| CN | 105849619 | 8/2016 |
| CN | 206489309 | 9/2017 |
| CN | 107430268 | 12/2017 |
| TW | I231401 | 4/2005 |

\* cited by examiner

PROJECTION DEVICE

CROSS-REFERENCE TO RELATED APPLICATION

This application claims the priority benefit of China application serial no. 201810551545.X, filed on May 31, 2018. The entirety of the above-mentioned patent application is hereby incorporated by reference herein and made a part of this specification.

BACKGROUND OF THE INVENTION

Field of the Invention

The invention relates to a display device, in particular, to a projection device.

Description of Related Art

An actuator is provided in an existing projection device to actuate a transparent element, such as a glass sheet, to move such that an image may be moved by half of a pixel, so as to effectively improve the resolution of the image projected by the projection device. In a light emission direction of a lens module, if a lens is located too close to the glass sheet, the lens may be interfered with the actuator, such as colliding with the actuator. Therefore, in the existing projection device, in order to avoid the problem of interference between the lens closest to the glass sheet and the actuator, distance between the glass sheet and the lens is usually increased. In this way, a back focal length between an imaging module, such as a light valve, and the lens closest to the glass sheet may be increased, and thus the overall size of the projection device may also be larger.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention provides a projection device, which effectively reduces the distance between a lens and a transparent element of an actuating module, thus reducing the size of the projection device, and effectively avoiding the problem of interference between at least one lens and an actuator, so as to reduce the production cost.

Other objectives and advantages of the invention may be further understood from the technical features disclosed in the invention.

In order to achieve one, some, or all of the aforementioned objectives or other objectives, an embodiment of the invention provides a projection device, including a lens module and an actuating module. The lens module includes at least one lens. The actuating module is disposed beside the lens module, and is relatively close to the lens. The actuating module includes a frame, a transparent element and at least one actuator. The transparent element is fixed on the frame. The actuator is disposed on at least one side edge of the frame and is connected to the frame. In a light emission direction of the lens module, an orthographic projection of the actuator on a first reference plane does not overlap with an orthographic projection of the lens on the first reference plane.

In an embodiment of the invention, the frame includes an inner frame, an outer frame and multiple connecting portions. The inner frame fixes the transparent element, and wraps around the transparent element. The outer frame surrounds the inner frame. The connecting portion connects the inner frame and the outer frame.

In an embodiment of the invention, the number of the actuator is one, and the actuator is connected to the side edge of the inner frame.

In an embodiment of the invention, the actuator includes two first actuators and two second actuators. The first actuators are separated from each other and connected to a first pair of side edges of the inner frame. The second actuators are separated from each other and connected to a second pair of side edges of the outer frame. The first actuators and the second actuators surround the transparent element.

In an embodiment of the invention, the outer frame is located among the connecting portions and the second actuators.

In an embodiment of the invention, the transparent element has a first surface, and the actuator has a second surface. On the first reference plane, the second surface is higher than the first surface.

In an embodiment of the invention, the lens has a third surface facing the transparent element, and on the first reference plane, the second surface is higher than the third surface.

In an embodiment of the invention, the projection device further includes an imaging module. The actuating module is located between the imaging module and the lens module. A back focal length is provided between the imaging module and the lens.

In an embodiment of the invention, the orthographic projection of the lens on the first reference plane overlaps with an orthographic projection of the transparent element on the first reference plane.

In an embodiment of the invention, the actuator includes a magnet and a coil.

Based on the foregoing, the embodiments of the invention have at least one of the following advantages or effects. In the design of the projection device according to an embodiment of the invention, in a light emission direction of a lens module, an orthographic projection of an actuator on a first reference plane does not overlap with an orthographic projection of a lens on the first reference plane. Therefore, the actuator does not interfere with the lens. In this way, the distance between the lens and a transparent element of an actuating module may be effectively reduced, thereby reducing the size of the projection device. Moreover, since the transparent element is fixed by a frame of the actuating module, the projection device according to an embodiment of the invention may effectively avoid the problem of interference between the lens and the actuator with the size of the transparent element remaining the same. Therefore, the production cost may be reduced.

In order to make the aforementioned and other objectives and advantages of the invention comprehensible, embodiments accompanied with figures are described in detail below.

Other objectives, features and advantages of the invention will be further understood from the further technology features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and the drawings belong to the specification and constitute a part of the specification. The drawings describe the embodiments of the invention, and are used to explain the principles of the invention together with the descriptions.

DESCRIPTION OF THE EMBODIMENTS

The aforementioned and other technical contents, features and effects of the invention will be clearly presented in the detail description of an exemplary embodiment with the accompanying drawings below. The directional terms mentioned in the following embodiments, like "above", "below", "left", "right", "front", or "back", refer to the directions in the appended drawings.

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1A:
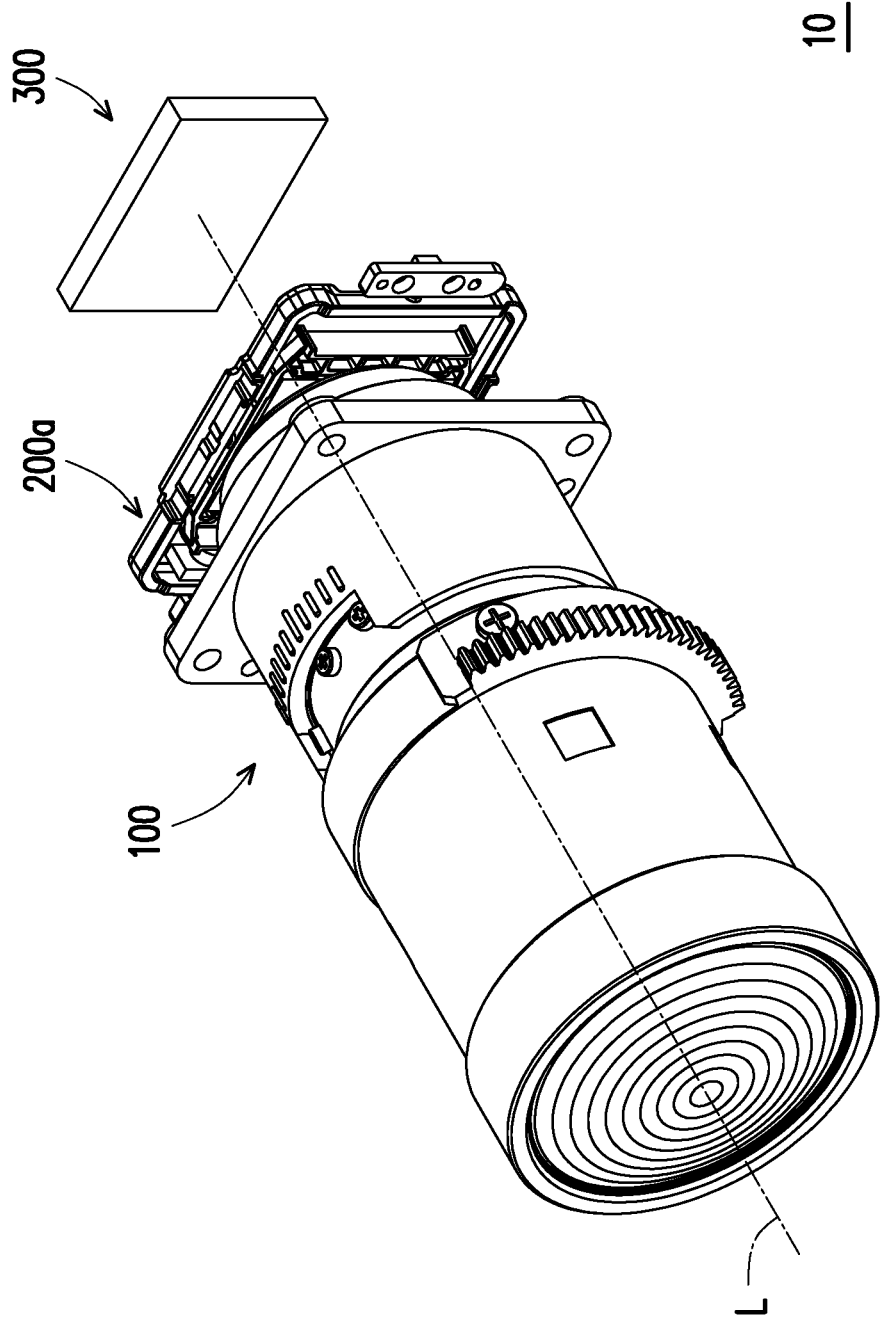
FIG. 1A is a partial three-dimensional schematic view of a projection device according to an embodiment of the invention.
Figure 1B:
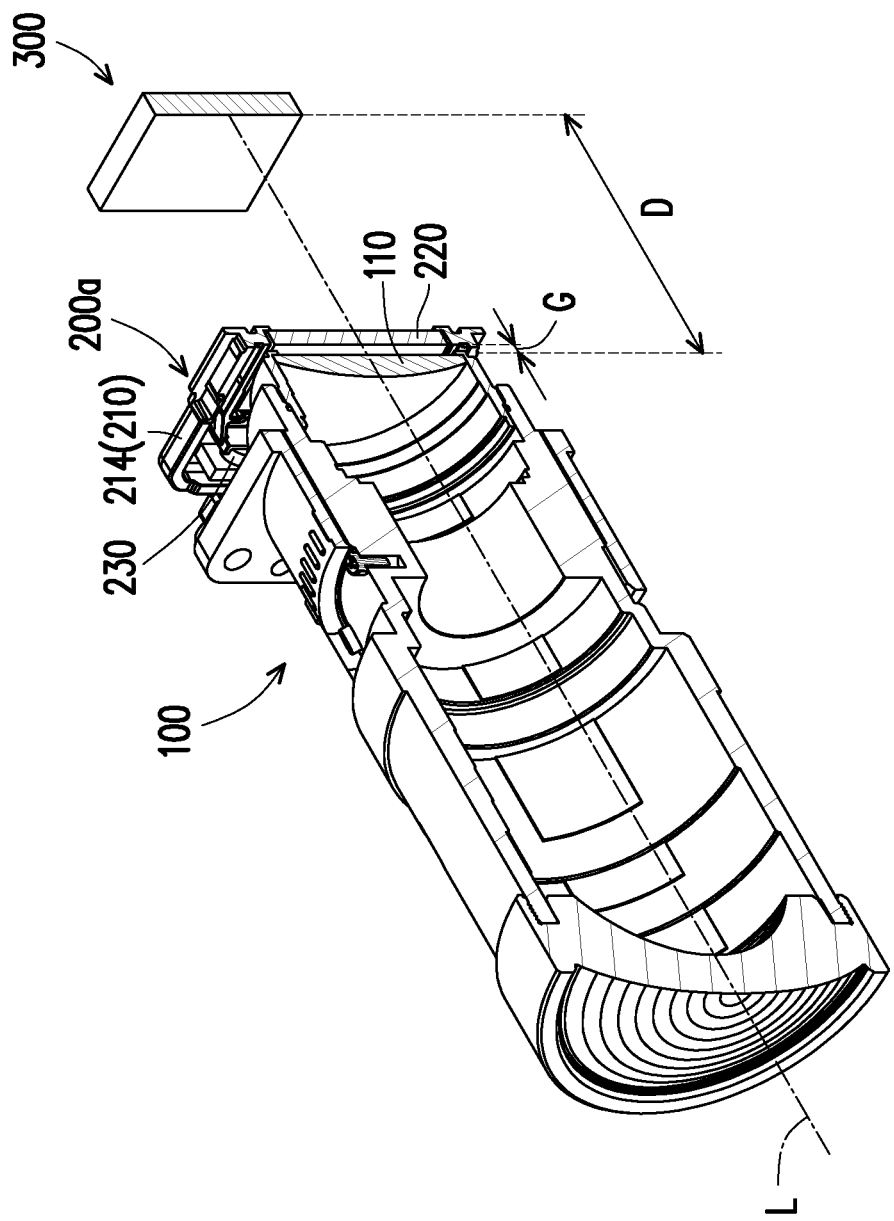
FIG. 1B is a partial three-dimensional cross-sectional schematic view of the projection device in FIG. 1A.
Figure 2A:
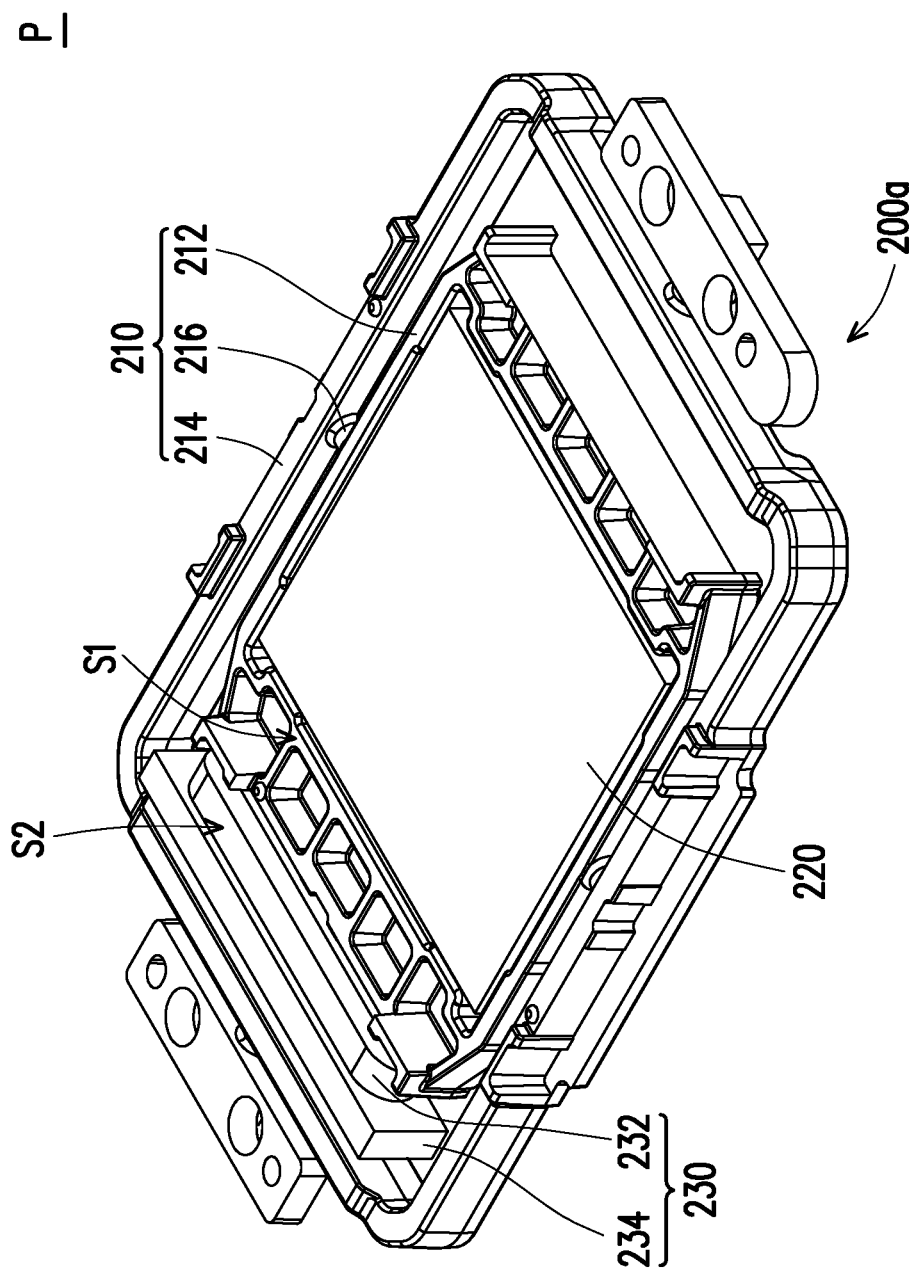
FIG. 2A is a three-dimensional schematic view of an actuating module of the projection device in FIG. 1A.
Figure 2B:
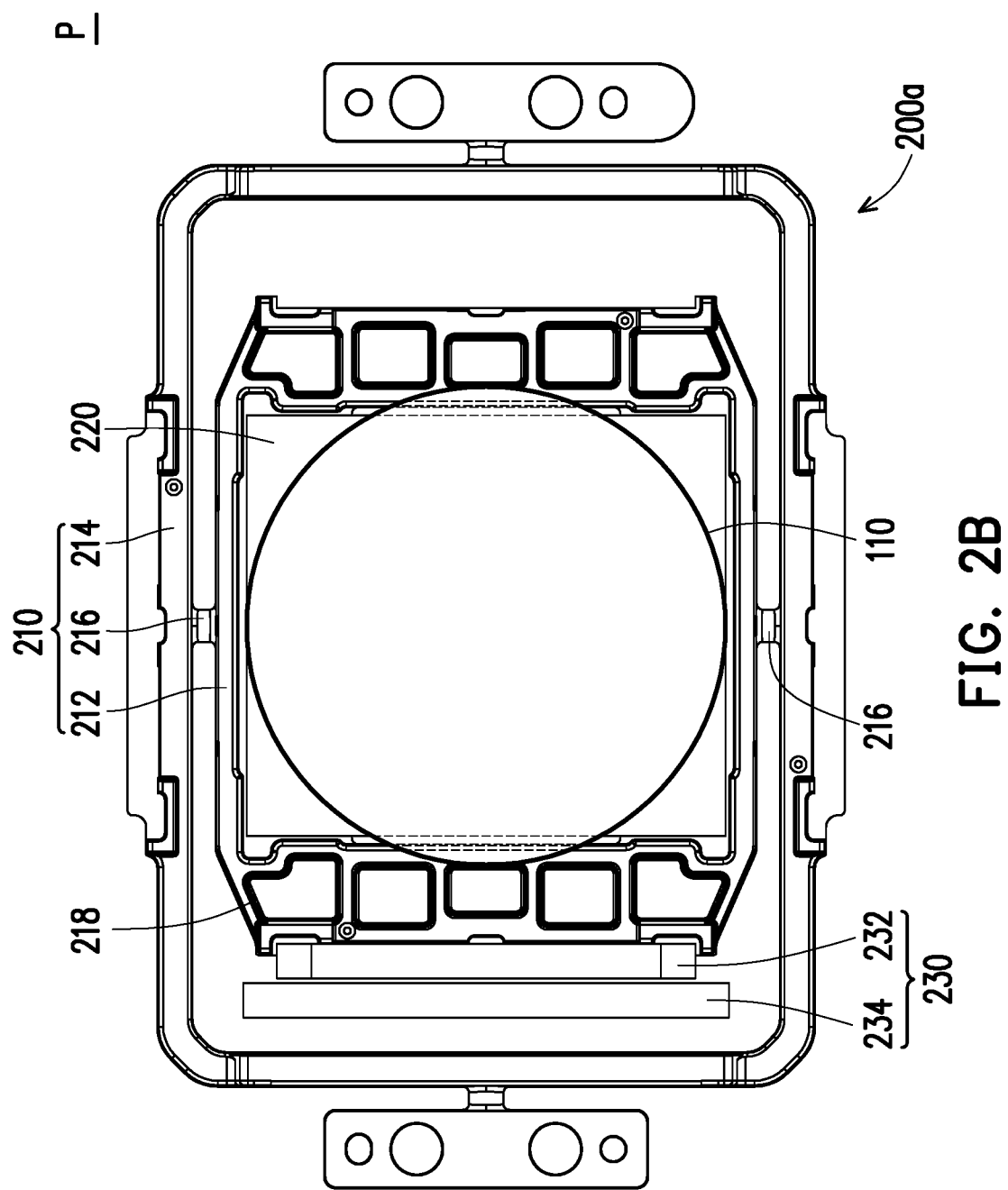
FIG. 2B is a front schematic view of a lens and an actuating module of the projection device in FIG. 1A with respect to a first reference plane.
Figure 3:
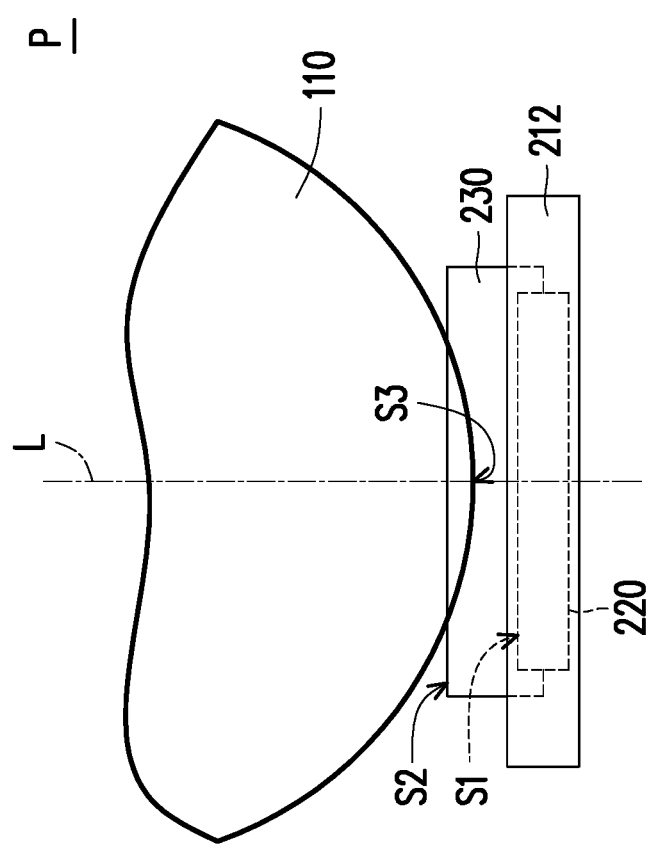
FIG. 3 is a side schematic view of the lens and the actuating module of the projection device in FIG. 1A.

FIG. 1A is a partial three-dimensional schematic view of a projection device according to an embodiment of the invention. FIG. 1B is a partial three-dimensional cross-sectional schematic view of the projection device in FIG. 1A. FIG. 2A is a three-dimensional schematic view of an actuating module of the projection device in FIG. 1A. FIG. 2B is a front schematic view of a lens and an actuating module of the projection device in FIG. 1A with respect to a first reference plane. FIG. 3 is a side schematic view of the lens and the actuating module of the projection device in FIG. 1A.

Referring to FIG. 1A, FIG. 1B, FIG. 2A and FIG. 2B, in the embodiment, a projection device 10 includes a lens module 100 and an actuating module 200a. In particular, the lens module 100 includes at least one lens 110. Here, only the lens 110 which is the closest to the actuating module 200a is schematically drawn. The actuating module 200a is disposed beside the lens module 100, and is closer to the lens 110. The actuating module 200a includes a frame 210, a transparent element 220 and at least one actuator 230. The transparent element 220 is, for example, a glass sheet, but it is not limited thereto. In other embodiments, the transparent element 220 may also be a lens having a refractive index. The transparent element 220 is fixed on the frame 210. The actuator 230 is disposed on at least one side edge of the frame 210, and is connected to the frame 210. Referring to FIG. 2B, in particular, in a light emission direction L of the lens module 100, the lens module 100 is used for transferring an image beam and projecting the image beam to the outside of the projection device 10. An orthographic projection of the actuator 230 on a first reference plane P does not overlap with an orthographic projection of the lens 110 on the first reference plane P. That is to say, on the first reference plane P, the position of the orthographic projection of the actuator 230 and the position of the orthographic projection of the lens 110 do not overlap with each other, and thus the problem of interference between the actuator 230 and the lens 110 closest to the actuating module 200a may be avoided. A normal direction of the first reference plane P is parallel to the light emission direction L. In addition, an orthographic projection of the lens 110 on the first reference plane P partially overlaps with an orthographic projection of the transparent element 220 on the first reference plane P.

Further, referring to FIG. 2A and FIG. 2B, the frame 210 of the embodiment includes an inner frame 212, an outer frame 214 and multiple connecting portions 216. The inner frame 212 is used for fixing the transparent element 220, and surrounds and wraps around the transparent element 220. The outer frame 214 surrounds the inner frame 212. The connecting portion 216 connects the inner frame 212 and the outer frame 214. Here, the inner frame 212 is provided such that the actuator 230 may be disposed farther from the transparent element 220 with the size of the transparent element 220 remaining the same. Therefore, the actuator 230 and the lens 110 closest to the transparent element 220 do not interfere. In short, the distance between the actuator 230 and the transparent element 220 is increased depending on the thickness of the inner frame 212. Since the size of the transparent element 220 in the actuating module 200a is not changed, the production cost will not be increased. The inner frame 212 has a fixing member 218, the fixing member 218 is located between the transparent element 220 and the actuator 230, and the fixing member 218 is used for fixing the transparent element 220.

Figure 4:
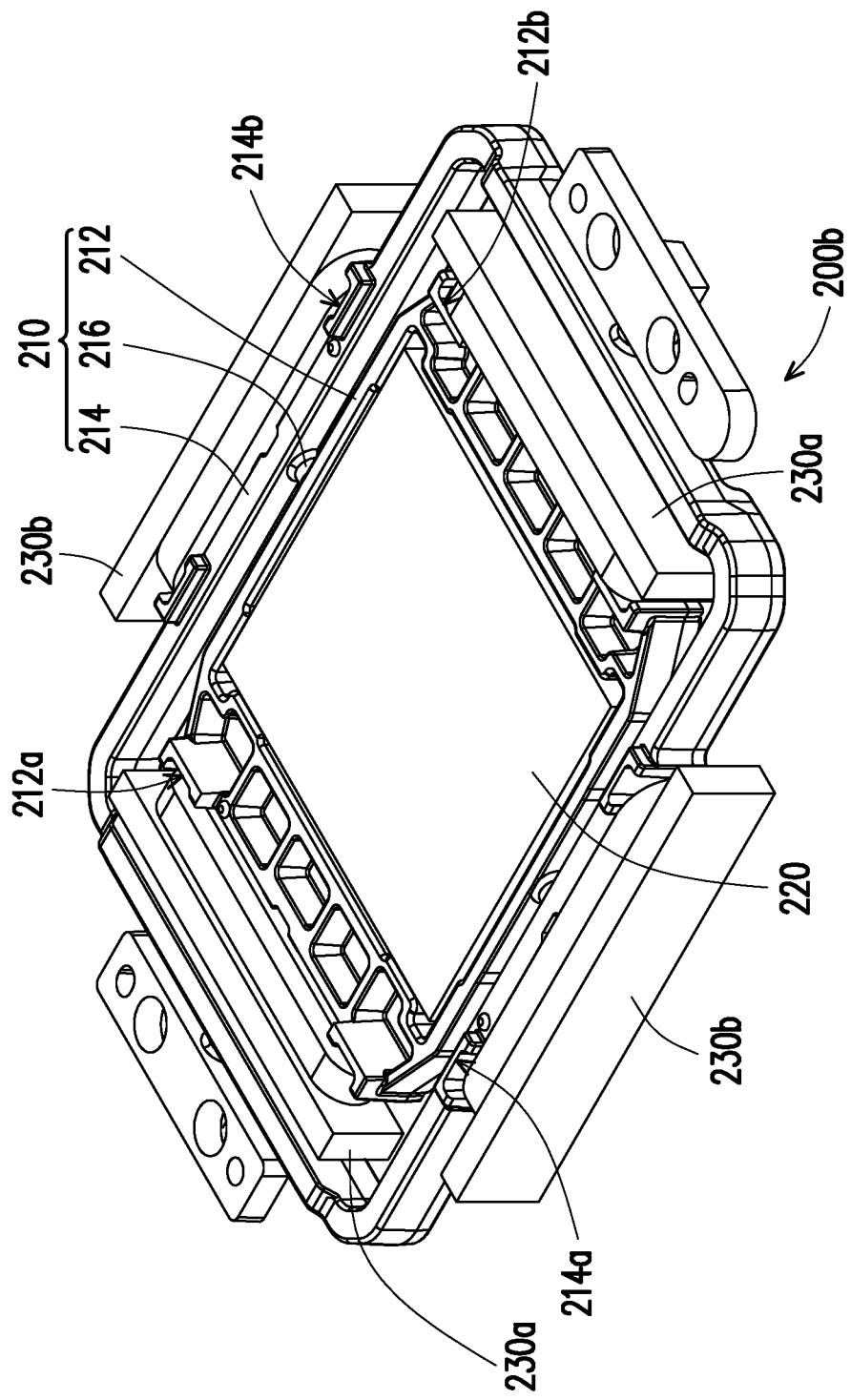
FIG. 4 is a three-dimensional schematic view of an actuating module according to another embodiment of the invention.

Besides, as shown in FIG. 2A and FIG. 2B, the number of the actuator 230 is one in the embodiment, and the actuator 230 is connected to the side edge of the inner frame 212. Of course, in other embodiments, there may be more than one actuator, and the actuator 230 may also be connected to the side edge, relatively away from the inner frame, of the outer frame 214. More specifically, in order to improve the resolution of the projection device 10, in another embodiment, referring to FIG. 4, the actuating module 200b includes two actuators 230, two first actuators 230a and two second actuators 230b. The first actuators 230a are separated from each other and connected to a first pair of side edges 212a, 212b of the inner frame 212. The second actuators 230b are separated from each other and connected to a second pair of side edges 214a, 214b of the outer frame 214. The first actuators 230a and the second actuators 230b surround the transparent element 220. In other words, the invention does not limit the number of the actuators 230 and the positions of the actuators 230. The situations where the orthographic projection of the actuator 230 on the first reference plane P does not overlap with the orthographic projection of the lens 110 on the first reference plane P all fall within the protection scope of the invention.

In the embodiment, a first reference line (not shown) is formed by a connection of the connecting portions 216. A second reference line (not shown) is formed by a connection of other connecting portions. The first reference line is perpendicular to the second reference line. Additionally, the arrangement of the fixing members 218 is perpendicular to the second reference line so as to enhance the strength of actuating module 200a in rotation.

Referring to FIG. 2A, FIG. 2B and FIG. 3 again, the actuator 230 of the embodiment is, for example, a voice coil motor. The actuator 230 is, for example, composed of a magnet 232 and a coil 234, so as to drive the transparent element 220 to move. Here, the transparent element 220 is fixed on the inner frame 212. Therefore, when the actuator 230 actuates, the inner frame 212 may be moved together with the transparent element 220 such that both of them may reciprocate along an axial direction and rotate with respect to the axial direction (e.g., uniaxial direction or biaxial direction). Thus, with the reciprocation motion of the transparent element 220, an image beam projected in the light emission direction L may be caused to shift alternatingly, such that an image may be moved by half of a pixel and the resolution of the projection device 10 is effectively improved. Referring to FIG. 3, more specifically, the transparent element 220 of the embodiment has a first surface S1, and the actuator 230 has a second surface S2. For example, with a surface, opposing the first surface S1 of the transparent element 220, being taken as the first reference plane P and on a second reference plane P', the second surface S2 is higher than the first surface S1. That is to say, the distance between the second surface S2 of the actuator 230 and the surface opposing the first surface S1 of the transparent element 220, is greater than the distance between the first surface S1 of the transparent element 220 and the surface opposing the first surface S1 of the transparent element 220. Besides, the lens 110 has a third surface S3 facing the transparent element 220, and on the second reference plane P', the second surface S2 is higher than the third surface S3. That is, the distance between the second surface S2 of the actuator 230 and the surface opposing the first surface S1 of the transparent element 220 is greater than the distance between the third surface S3 of the lens 110 and the surface opposing the first surface S1 of the transparent element 220. The second reference plane P' is perpendicular to the first reference plane P. On the first reference plane P, the lens 110 may be closer to the transparent element 220 due to the fact that the orthographic projection of the actuator 230 does not overlap with the orthographic projection of the lens 110, and the distance G (referring to FIG. 1B) between the lens 110 and the transparent element 220 may be smaller. On the second reference plane P', the second surface S2 of the actuator 230 is higher than the first surface S1 of the transparent element 220. At this time, on the second reference plane P', the orthographic projection of the lens 110 partially overlaps with the orthographic projection of the actuator 230. Therefore, the lens 110 may be very close to the transparent element 220. In addition, on the second reference plane P', the orthographic projection of the inner frame 212 does not overlap with the orthographic projection of the lens 110.

In addition, referring to FIG. 1A and FIG. 1B, the projection device 10 of the embodiment further includes an imaging module 300. The actuating module 200a is located between the imaging module 300 and the lens module 100, and a back focal length (BFL) D is provided between the imaging module 300 and the lens 100. Here, the imaging module 300 is, for example, a reflection-type light valve, such as a digital micro-mirror device (DMD) or a reflection-type liquid crystal on silicon (LCOS), but it is not limited thereto. In other embodiments, the imaging module 300 is a transmission-type light valve, such as a transparent liquid crystal panel. Since the distance G (referring to FIG. 1B) between the lens 110 of the lens module 100 closest to the transparent element 220 and the transparent element 220 may be reduced due to the fact that the orthographic projection of the actuator 230 on the first reference plane P does not overlap with the orthographic projection of the lens 110 on the first reference plane P, the back focal length D between the imaging module 300 and the lens 100 is also shorter, and the size of the projection device 10 may be effectively reduced.

Based on the foregoing, in the design of the projection device according to an embodiment of the invention, in a light emission direction of a lens module, an orthographic projection of an actuator on a first reference plane does not overlap with an orthographic projection of a lens on the first reference plane, and therefore the actuator does not interfere with the lens. In this way, the distance between the lens and a transparent element of an actuating module may be effectively reduced, thereby reducing the size of the projection device. Moreover, the transparent element is fixed by a frame of the actuating module, and the projection device according to an embodiment of the invention may effectively avoid the problem of interference between the lens and the actuator with the size of the transparent element remaining the same. Therefore, the production cost may be reduced.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A projection device, comprising:
   a lens module, comprising at least one lens and being used for transferring an image beam; and
   an actuating module, disposed beside the lens module and relatively close to the at least one lens, the actuating module comprising:
     a frame;
     a transparent element, fixed on the frame; and
     at least one actuator, disposed on at least one side edge of the frame and connected to the frame, wherein in a light emission direction of the lens module, an orthographic projection of the at least one actuator on a first reference plane, whose normal direction is parallel to the light emission direction, does not overlap with an orthographic projection of the at least one lens on the first reference plane, thereby avoiding an interference between the at least one lens and the actuating module,
   wherein the frame comprises:
     an inner frame, fixing the transparent element, and wrapping around the transparent element;
     an outer frame, surrounding the inner frame; and
     a plurality of connecting portions, connecting the inner frame and the outer frame,
   wherein the transparent element comprises a first surface, the at least one actuator comprises a second surface, and on a second reference plane, the second surface is higher than the first surface,
   wherein the at least one lens comprises a third surface facing the transparent element, and on the second reference plane, the second surface is higher than the third surface.

2. The projection device according to claim 1, wherein the at least one actuator is connected to the side edge of the inner frame.

3. The projection device according to claim 1, wherein the at least one actuator comprises two first actuators and two second actuators, the two first actuators are separated from each other and connected to a first pair of side edges of the inner frame, the two second actuators are separated from each other and connected to a second pair of side edges of the outer frame, and the two first actuators and the two second actuators surround the transparent element.

4. The projection device according to claim 3, wherein the outer frame is located among the plurality of connecting portions and the two second actuators.

5. The projection device according to claim 1, wherein an orthographic projection of the inner frame on the second reference plane does not overlap with an orthographic projection of the at least one lens, and wherein the first reference plane is perpendicular to the second reference plane.

6. The projection device according to claim 1, further comprising:
   an imaging module, the actuating module being located between the imaging module and the lens module, wherein a back focal length is provided between the imaging module and the at least one lens.

7. The projection device according to claim 1, wherein an orthographic projection of the at least one lens on the first reference plane partially overlaps with an orthographic projection of the transparent element on the first reference plane, and wherein the first reference plane is perpendicular to the second reference plane.

8. The projection device according to claim 1, wherein an orthographic projection of the at least one lens on the second reference plane partially overlaps with an orthographic projection of the actuator, and wherein the first reference plane is perpendicular to the second reference plane.

9. The projection device according to claim 1, wherein the at least one actuator comprises a magnet and a coil.

* * * * *